Sept. 4, 1973  J. SHIELDS ET AL  3,756,897
LABEL LAMINATING MACHINE
Filed June 2, 1971  5 Sheets-Sheet 1

BY *Hofgren, Wegner, Allen, Stellman & McCord.*
ATTORNEYS.

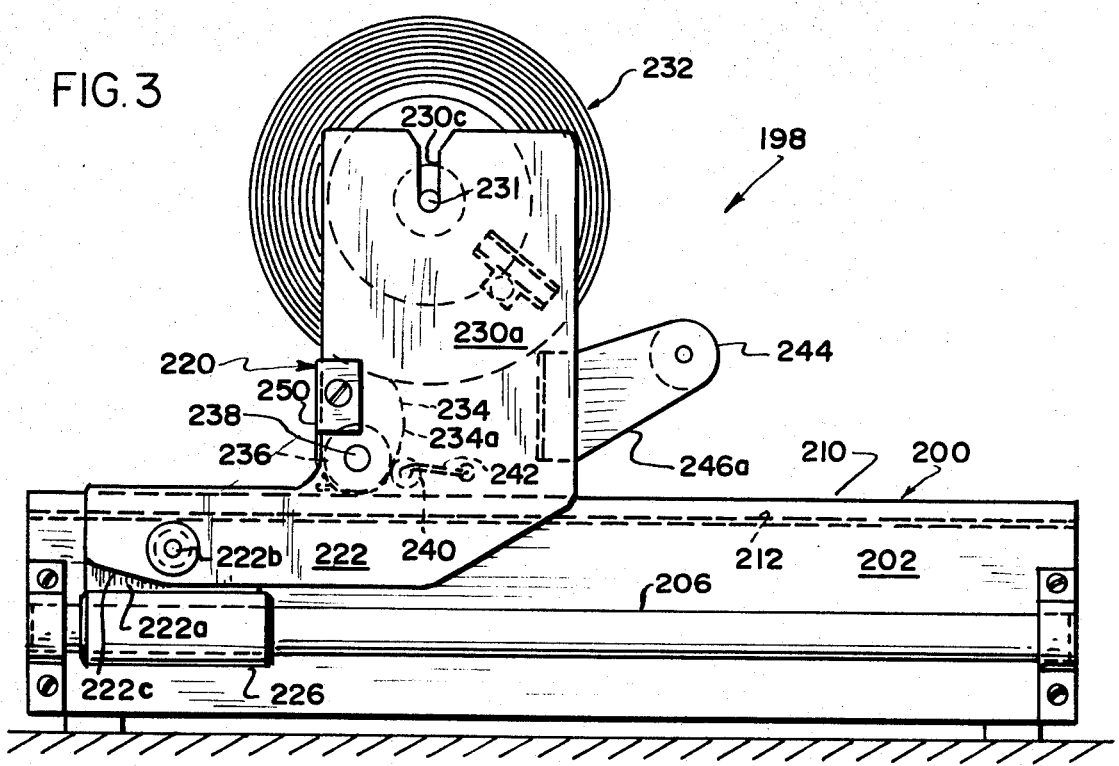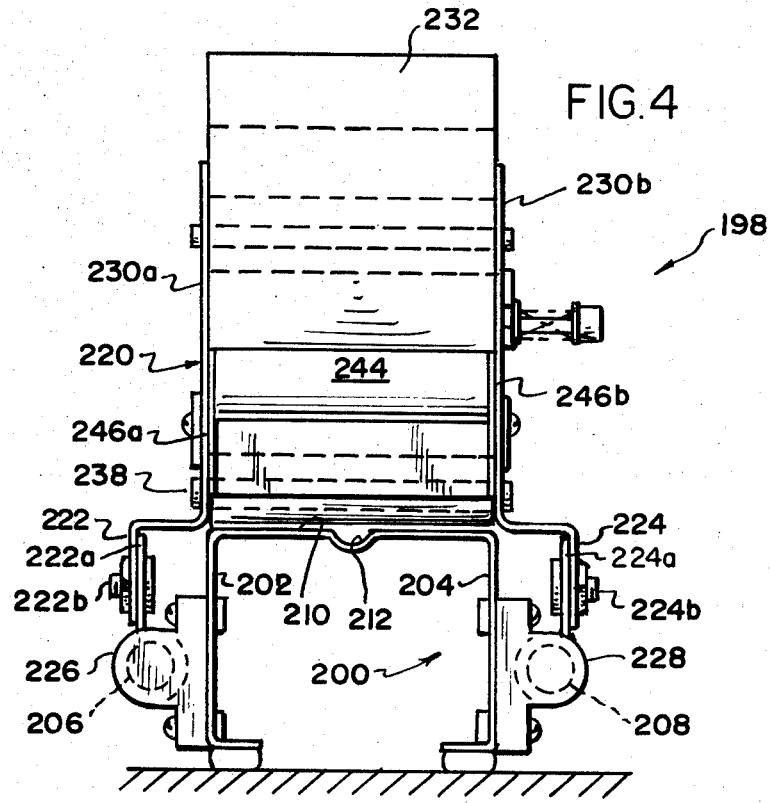

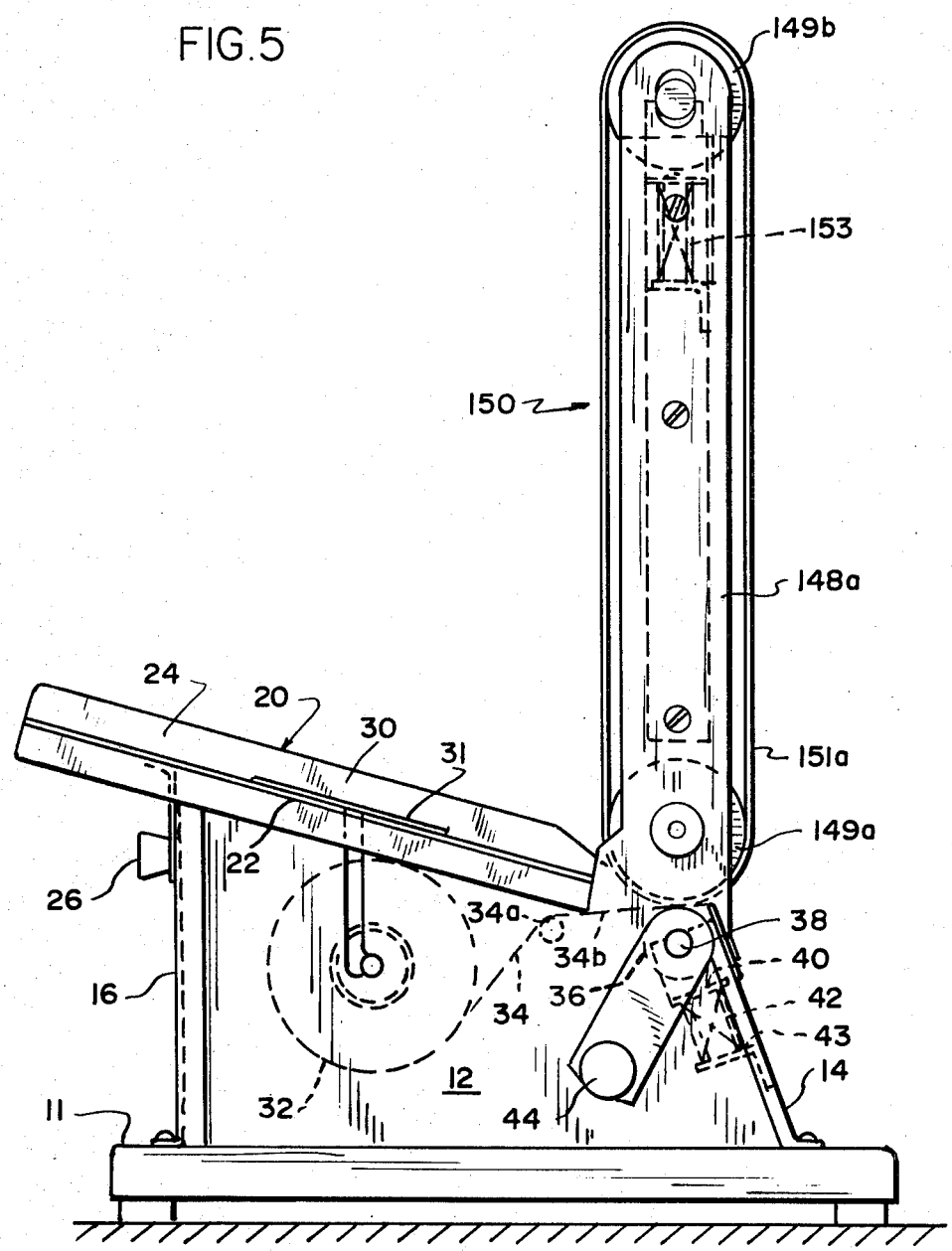

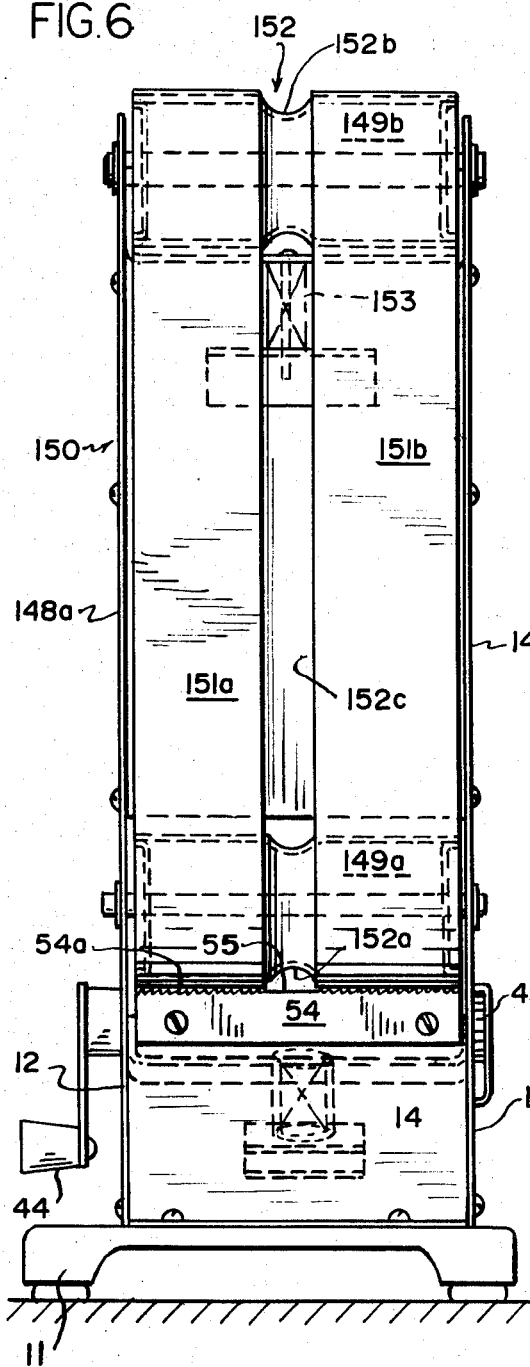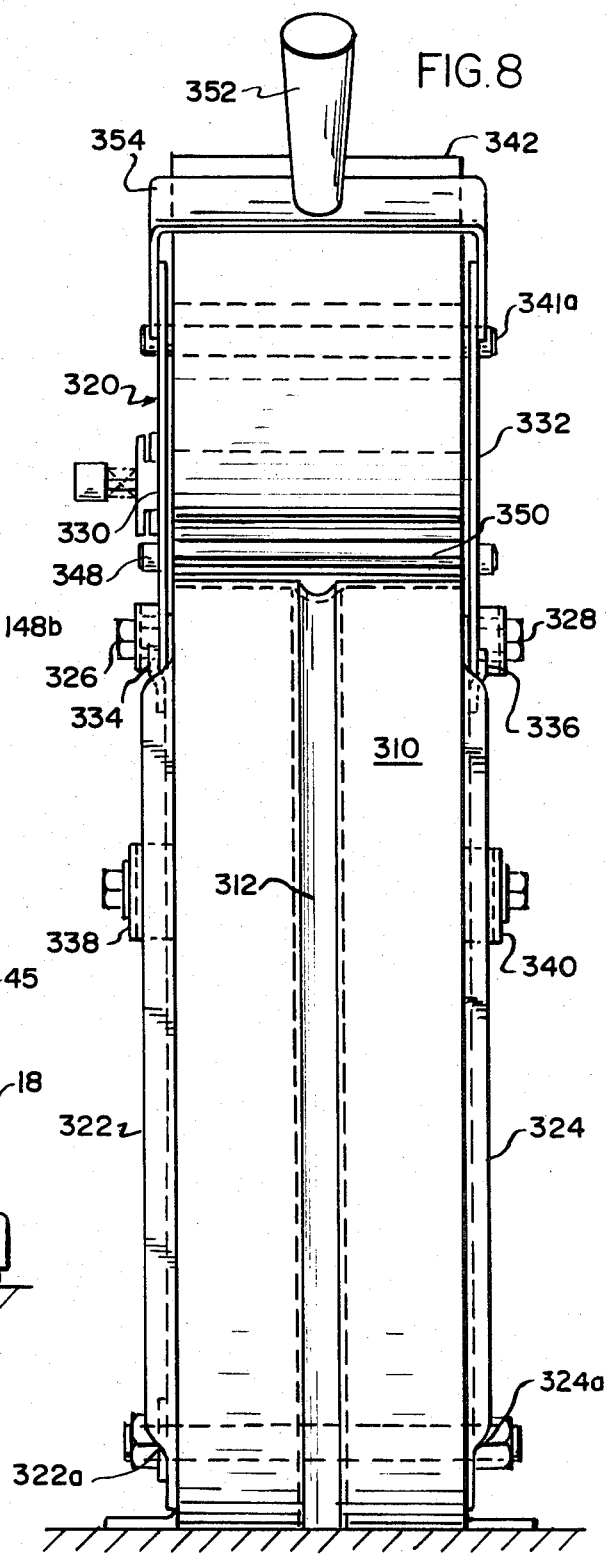

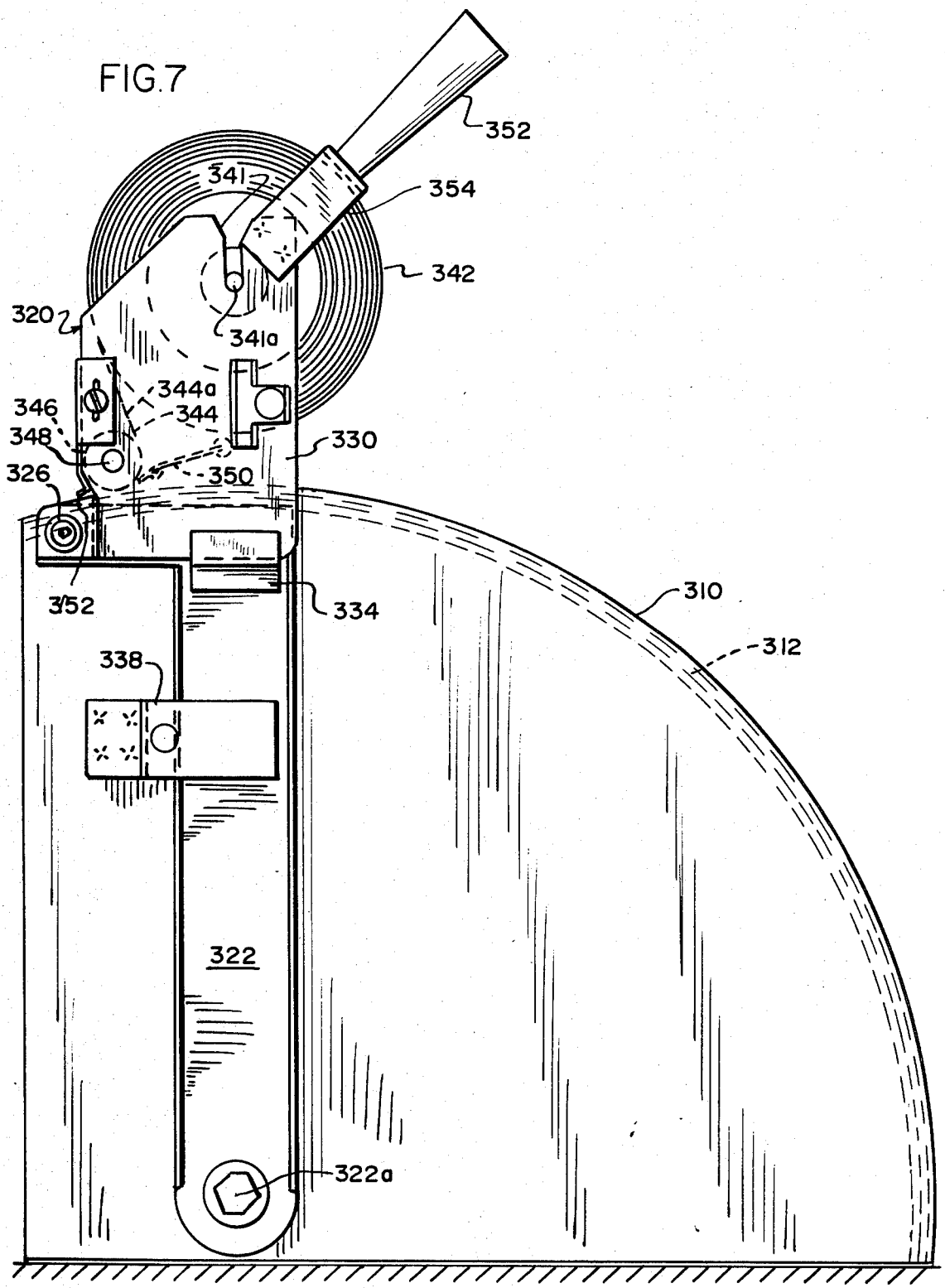

United States Patent Office 3,756,897
Patented Sept. 4, 1973

3,756,897
LABEL LAMINATING MACHINE
John Shields, Terre Haute, Ind., and Lyman D. Dunn, Chicago, Ill., assignors to Marlan Company
Filed June 2, 1971, Ser. No. 149,243
Int. Cl. B32b 31/18, 31/20
U.S. Cl. 156—517                    14 Claims

ABSTRACT OF THE DISCLOSURE

An apparatus for laminating a label or card-like article to an adherent strip including a label-feeding ramp, for feeding the label to laminating rollers into engagement with the adherent strip, characterized by the provision of a laminating roller and an enlarged or elongated platen means onto which the adherent strip and laminated label are fed, with the platen means having a medially located groove for grasping the laminated tape and label and stripping the same therefrom.

BACKGROUND OF THE INVENTION

Field of the invention

This invention relates to a laminating apparatus and more particularly, to an improved label laminating device for laminating a card-like article to an adherent strip.

Brief description of the prior art

Dunn Pat. 3,340,130 shows a label laminator device having an inclined ramp for feeding a label towards two laminating rollers, between which a leader portion from a roll of adherent tape is also fed for laminating the card-like label to the strip of tape, following which the tape may be severed from the remainder thereof. The upper roller is positioned for slight movement within a notch-like mounting arrangement.

Isbey Pat. 3,132,581 shows a sheet laminating device and discloses the advantage of resiliently biasing one of the laminating rollers in opposition to the other. The structure shown in the Dunn, 3,340,130 patent has been satisfactory for accomplishing its intended function, that is, of laminating a label to the tack or adhesively coated side of a clear plastic tape so that following such lamination the label may be applied to a package or the like. However, it has been found that at times it has been cumbersome to deal with the elongated leader strip which projects forwardly from the apparatus as the leader portion of the tape and the laminated label are pulled between the laminating rollers. Occasionally the resultant laminated product has not been as clear as desired with some wrinklings occurring from time to time.

Other related art includes the Spinner et al. Pat. 2,334,963, which shows a laminating machine for laminating a paper-like article onto a cellophane strip, and Beale Pat. 328,639, which discloses a roller arrangement wherein the lower roller of a paper calendering assembly has circumferential grooves therein.

SUMMARY OF THE INVENTION

This invention is directed, in brief, to an improved label or card-like laminating apparatus.

The best mode currently contemplated for carrying out the invention includes the provision of a frame for supporting a roll of adherent tape therein and an inclined ramp at the top of the frame. The ramp leads towards a laminating roller arrangement including a lower roller and an enlarged drum-like roller having a medial circumferential groove. The lower roller is biased upward against the upper drum.

In another embodiment of the invention, the upper roller unit, instead of being an enlarged drum, comprises an elongated belt arrangement with the belt arrangement consisting of two closely spaced apart belts so that the space between the belts serves the same function as the medial groove in the drum of the first embodiment.

A third embodiment of the invention includes the provision of an elongate flat bed or platen with a carrier assembly mounted for slidable movement along the platen. The carrier assembly includes a laminating roller and also supports the tape roll. In use, it is intended that a card-like article would be placed on the platen and the tape laminated thereon as the carrier is traversed along the platen.

In a fourth embodiment of the invention the platen is arcuate rather than flat, as in the third embodiment of the invention. In both the third and fourth embodiments the platen also as a medial groove or the like, to facilitate the separation of the completed laminated tape and card-like article from the platen.

DESCRIPTION OF THE DRAWINGS

FIG. 3 is a side elevational view of another embodiment of the laminating apparatus of this invention;

FIG. 4 is an end elevational view of the embodiment shown in FIG. 3;

FIG. 5 is a side elevational view of a different embodiment of this invention;

FIG. 6 is an end elevational view of the embodiment shown in FIG. 5;

FIG. 7 is a side elevational view of a fourth embodiment of this invention; and

FIG. 8 is an end elevational view of the embodiment shown in FIG. 7.

Figure 1:
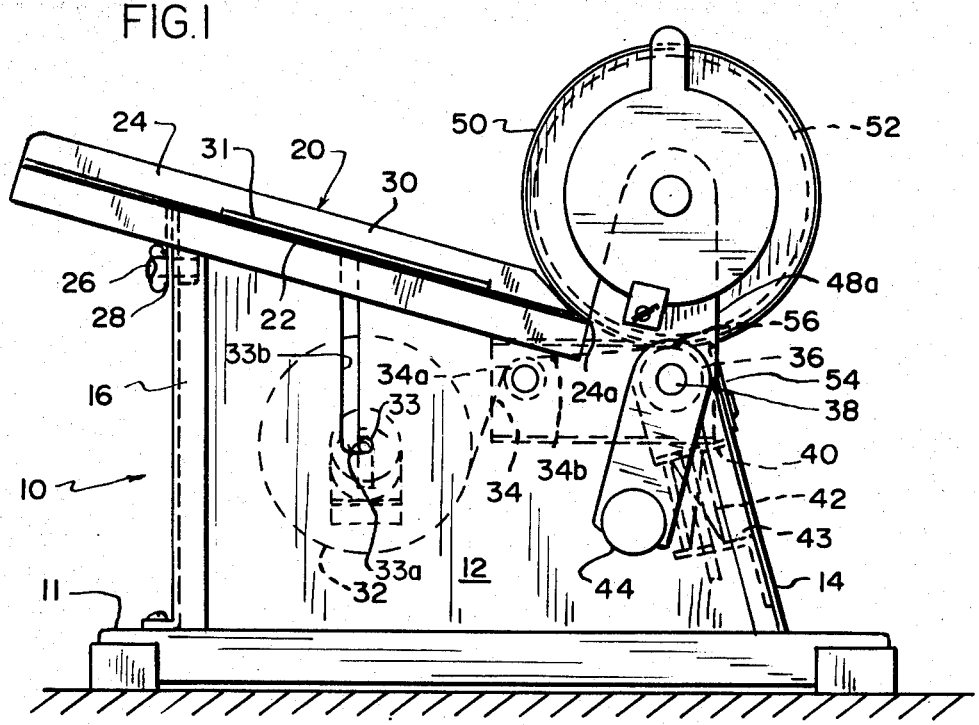
FIG. 1 is a side elevational view of a preferred embodiment of the laminating apparatus of this invention.

While this invention is susceptible of embodiment in many different forms, there is shown in the drawings and will herein be described in detail several embodiments therefor, with the understanding that the present disclosure is to be considered as an exemplification of the principles of the invention and is not intended to limit the invention to the embodiments illustrated.

BRIEF DESCRIPTION OF THE PREFERRED EMBODIMENTS

The laminator 10 of this invention includes a base 11 having upright walls 12, 14, 16 and 18 defining a supporting frame or housing structure. The walls support a paper feed structure generally indicated 20, including an inclined ramp 22 having an overlying tray 24. Tray 24 is associated with ramp 22 by a screw and slot arrangement 26–28 to provide a means for laterally adjusting the tray 24 relative to ramp 22. Tray also includes a flange 30 along one side thereof, and this flange, together with the lateral adjustment feature, provides a means for guiding and accommodating different widths of labels or card-like articles 31 to be laminated by the apparatus 10. A tape roll 32 is rotatably mounted between the side walls 14 and 18 by being rotatably supported on rod 33 which is positioned in offset ends 33a of vertical slots 33b in each wall 14 and 28. A web, leader, or strip 34 of tape extends from roll 32, and the web or strip 34 has an adhesively coated side 34a and a non-adhesively coated side 34b. Preferably, the tape roll is of a clear plastic tape.

At the forward end of the laminator near the wall 14, there is provided a lower pressure roller 36, preferably made of rubber, or a suitably resilient material, rotatably mounted on an axle 38 generally between the walls 12 and 18. The axle 38 is positioned within a yoke 40, and a spring means 42 is interposed between a bracket 43 on the interior wall 18 in the underside of a yoke 40 to normally bias the lower roller 36 upwardly. A crank arm 44 may be provided on one end of the shaft or axle 38 for rotating the axle 38, or the axle 38 could be actuated by a small electric motor or the like. To insure that only advance rotation is imparted by the crank arm 34 through axle 38 to roller 36, a suitable one-way advance mechanism, such as a gravity urged dog and gear means 45 could be provided on the opposite end of the axle 38.

Each of the walls 12 and 18 is provided with uprights 48a and 48b extending above roller 36 near end wall 14. A platen means or drum 50 is mounted between the uprights 48a and 48b on an axle 50a which is rotably received within the uprights. Preferably, the drum or upper pressure roller 50 is in peripheral engagement with the lower pressure roller 36 and, in the preferred embodiment, is made of a metallic material having a knurled periphery which may, if desired, be coated with a suitable release material, such as that sold under the trademark "Teflon" or may be coated with a nickel plating. The drum 50 is provided with a means 52 for facilitating the grasping of a laminated tape and card article with this means 52 here shown as a medial circumferential groove in the drum.

A cutting blade 54 is mounted on the wall 14 preferably about one inch from the axis of axle 38. It has been found that it may be desirable to bevel the teeth 54a of the cutting blade at an angle, such as 45°, to the interior face thereof. It has further been found desirable to provide an interruption 55 in the serrated or toothed edge of the cutting blade with this interruption 55 defining a straight edge, preferably underlying the medial circumferential groove 52 in the drum 50.

As best seen in FIG. 1, the forward edge 24a of the tray 24 terminates rearwardly of the line of tangential contact 56 between the upper drum 50 and the lower pressure roller 36. In use, a card-like article, or label, 31, is placed face down on the tray 24 and dropped into touching engagement with the leader portion 34, and particularly, the adhesively coated side 34a thereof, in the area 56 of the bight or tangential contact between the roller 36 and drum 50. Roller 36 is then advanced by rotating the crank arm 44 with the tape and label being wound upwardly about the drum 50 until the desired length of tape or leader portion 34 has been advanced. To assist in determining the proper advance, an adjustable point arrangement could be associated with the uprights 48a and 48b and a scale formed on the sides of the drum 50. The user then removes the tape and laminated label from the drum 50 by grasping the tape in the area of groove 52 and pulling outwardly and downwardly, away from the drum 50, to sever the strip along the toothed edge 54a and interrupted portion 55 of the blade 54.

It is believed that the groove or slot 52 in the drum 50 provides for easy stripping of the tape and laminated label away from the drum 50 without wrinkling of the tape. Also, it is believed that this groove 52 stretches the tape in the area about the groove to tend to put a reverse bend in the tape so that it will not tend to roll and stick on itself. Furthermore, the knurled periphery of the drum 50 further assists in providing the aforementioned advantages.

The beveled and toothed edge 54a of the cutting blade 54 urges the leading end of the remainder of the severed strip upwardly toward the drum 50 as soon as the remainder of the strip and its associated label is severed along this edge. The interrupted portion or straight edge portion 55 of the toothed edge 54a of blade 54 tends to prevent lengthwise tearing of the strip during the crosswise severance thereof along the toothed edge 54a.

Figure 2:
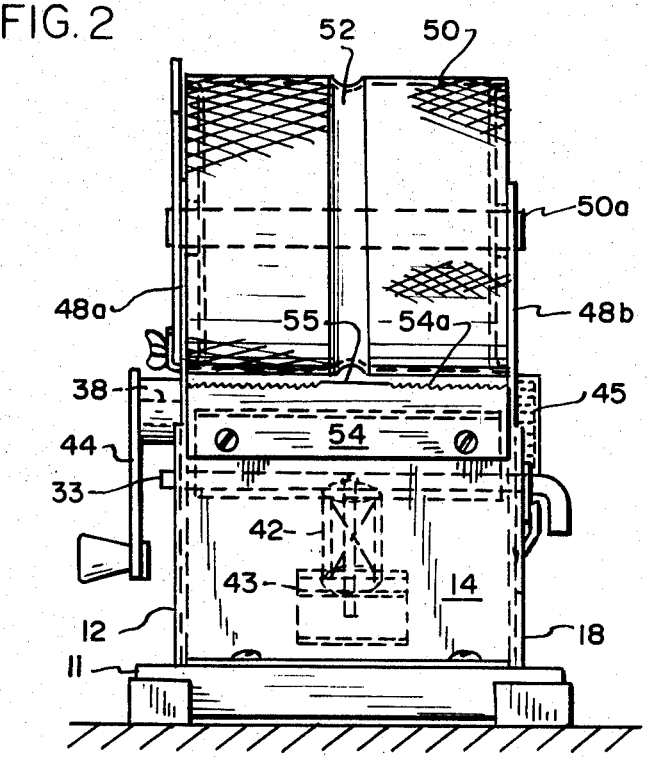
FIG. 2 is an end elevational view of the embodiment shown in FIG. 1.

In the structure shown in FIGS. 5 and 6, the elements 11 through 44 are all substantially the same or similar to that described with respect to FIGS. 1 and 2. However, the specific difference resides in the configuration of the means analogous to the upper platen or drum 50. In the structure shown in FIGS. 5 and 6, the side walls 12 and 18 have extended upright portions 148a and 148b which support lower and upper roller members 149a and 149b therebetween. An upper platen or drum means 150 is defined by a pair of spaced apart belt members 151a and 151b which are wound about the rollers 149a and 149b. The groove means 152 is provided by the circumferential grooves 152a in each of the upper and lower rollers 149a and 149b as well as the space 152c between the two belts 151a and 151b. If desired, spring means 153 may be associated between the rollers 149a and 149b for urging the rollers apart, thereby maintaining tension in the belts 151a and 151b.

The operation of the embodiment shown in FIGS. 5 and 6 is substantially similar to that described with respect to the embodiments shown in FIGS. 1 and 2 with the added advantage that the drum means 150 provides for a longer lead of tape 34 so that it may be useful with extremely long labels or cards, or in those instances where an extremely extensive amount of adherent tape lead is desired for affixation of a label onto another surface.

In the embodiment 198 shown in FIGS. 3 and 4 there is provided a base, generally indicated 200, with side walls 202 and 204, each of which support a suitable first guide means or rod-like rails 206 and 208. The base has an upper platen surface 210 which serves a function analogous to the drum 50 and drum means 150, previously described herein. Generally speaking, the upper surface 210 serves the function of being a platen or the like, during the laminating of a card-like article onto a leader portion of a tape roll. Accordingly, the upper surface 210 is provided with a longitudinally extending medial groove 212. The embodiment 198 shown in FIGS. 3 and 4 further includes an upper carrier assembly generally indicated 220, which is provided with depending side walls 222 and 224, which widely embrace side walls 202 and 204 of the base 200. Each of the depending side walls 222 and 224 supports a second guide means or sleeves 226 and 228 which slidably embrace the rail means 206 and 208 for mounting the upper carrier 220 for to-and-fro movement along the length of the base 200 and, particularly, with respect to the upper surface or platen surface 210 thereof.

The carrier 220 includes spaced uprights 230a and 230b having slots 230c therein for receiving the axle 231 of a tape roll 232 for rotatably mounting the tape roll therein. The tape roll includes a leader portion 234 which has an adhesively coated side 234a that is fed around a pressure roller 236 rotatably mounted on an axle 238 which spans the sides 230a and 230b of the carrier assembly 220. A small roller 240 is mounted on a spring mounting 242 in opposition to the roller 236 to maintain the leader 234 from the tape roll 232 in a position for tangential contact with the roller 236 so that the adhesively coated face 234a will be in opposition to the surface 210 of the base 200.

The carrier 220 further includes a handle 244 which is mounted on spaced apart outwardly projecting bracket members 246a and 246b so that the entire carrier 220 may be easily pulled along the surface 210 of the base 200. In addition, the depending side walls 222 and 224 are of two parts so that the sub-portion 222a, which supports the sleeve 226 as well as the sub-portion 224a, which supports the sleeve 228, are pivoted by means of connections 222b and 224b, respectively. The depending side portions 222 and 224 have a beveled end portion, such as the portion 222c, which provides for limited pivotal movement of the carriage 220 relative to the sleeves until the portions 222c engage the sleeves 226 and 228.

In use a card 31 or the like, may be placed on the surface 210 and the carriage 222 pulled across the card and surface 210 so that the adhesively coated side 234a of leader 234 is applied to the surface 210 on the card 31. A tear-off blade arrangement 250 is provided on the carriage 220 adjacent to the roller 236 so that when the carriage 220 is in an extreme advanced position, or all the way to the right, as viewed in FIG. 3, the laminated leader portion 234 and card 31 may be peeled from the surface 210 by grasping with the aid of the groove 212, lifted upwardly and severed by means of the blade 250. To return the carriage 220 to the initial position, or to the left as shown in FIG. 3, carriage 220 may be swung slightly upwardly by means of the pivotal connection 222b, 224b and returned to the initial position with the remaining leader portion 234 of tape roll 232 out of contact with the surface 210.

Finally, in the embodiment shown in FIGS. 7 and 8, the theory of operation is similar to that with respect to the structure disclosed in FIGS. 3 and 4 with the exception that the platen or surface 310 is an arcuate segment, rather than a generally planar surface, as is the case with the platen 210. Moreover, the carriage 320 is mounted on arms 322 and 324 that are pivoted to the platen at 322a and 324a, so that the carriage 320 may be swung through an arc from an upright position, as shown in FIG. 7, through a laminating path of travel to a downward position to laminate a card-like article 31, or the like, which may be applied to the surface 310. Surface 310 is also provided with a medial groove 312 as is the case with the surface 210 of the structure shown in FIGS. 3 and 4.

The carriage 320 is associated with the arms 322 and 324 through a pivotal connection afforded by the pin-like fastenings 326 and 328 extending between the arms 322 and 324 and the upright supporting members 330 and 332. A supporting bracket 334 and 336 on the arms 322 and 324 holds the uprights 330 and 332 against downward movement relative to the arms 322 and 324. Brackets 338 and 340 on the sides of the platen 310 provide an upright stop for the arms 322 and 324.

The carriage 320 includes slots 341 for receiving the axle 341a of a tape roll 342. Tape roll 342 also has a leader 344 with an adhesively coated side 344a and the leader 344 is wound around a pressure roller 346 rotatably mounted on axle 348 between the portions 330 and 332 of the carriage 320. Again, a spring urged pressing means 350 is provided for urging the leader 344 about the pressure roller 346. In addition, a cutting edge 352 is provided on the carriage 320 adjacent the roller 346.

In operation, a card-like article 31 is placed on surface 310 and carriage 320 is grasped by handle 352, mounted on yoke 354, to pull the carriage 320 downwardly about the pivotal mounting 322a-324a of the arms 322 and 324.

The roller 346 of carriage 320 laminates the leader portion 344 onto the card-like article 31 as the carriage is pulled through its arcuate path of travel across the platen surface 310. Following this, the lamination may be removed from the platen 310 by grasping the same in the area of the groove 312 and pulling it away from the surface 310 so that it may be severed along the knife edge 352. The carriage may then be pivoted upwardly relative to the arms 322 and 324 to bring the remaining portion of leader 344 out of contact with surface 310 so that the entire carriage and arm assembly may be returned to the upright position as shown in FIG. 7.

In the operation of the laminating apparatus of this invention a leader strip of tape is pulled from one roll, mainly the tape roll, and has a label or card applied to the sticky side thereof following which the strip of tape is transferred to another roll or platen-like surface with the adhesive coated side in engagement with the second surface. Following this, the strip is removed from the second surface for application to a third surface, such as a shipping carton, or the like. In some instances it may be desirable to apply the tape strip to an ultimate or third surface without a card or label and this could be accomplished by eliminating the step of feeding a card or label down the ramp 22.

The foregoing detailed description has been given for clearness of understanding only, and no unnecessary limitations should be understood therefrom, as some modifications may be obvious to those skilled in the art.

What is claimed is:

1. An apparatus for laminating a card-like article to an adherent strip comprising: means defining a housing; guide means on said housing for guiding a card-like article said guide means having a rear end and a forward end; means in said housing for retaining a supply of adhesive strip material having an adhesively coated side, a biased laminating pressure roller adjacent the forward end of the guide means, and a drum-like platen means supported on said housing above the pressure roller and being substantially enlarged relative to said pressure roller with said adherent strip being fed towards said pressure surface and platen means so that the adhesive side thereof faces said platen surface.

2. The apparatus of claim 1 wherein said platen means has a knurled exterior surface.

3. The apparatus of claim 1 wherein said platen means has a medially positioned recess.

4. The apparatus of claim 3 wherein a cutting blade is positioned adjacent the laminating pressure surface on the side thereof opposite said guide means.

5. The apparatus of claim 4 wherein said cutting blade includes a serrated cutting edge with a non-serrated portion adjacent the recess in said platen means.

6. The apparatus of claim 1 wherein the guide means comprises an inclined ramp.

7. The apparatus of claim 6 wherein the platen means is mounted for only rotational movement about its axis and is normally in tangential engagement with said pressure roller.

8. An apparatus for laminating a card-like article to an adherent strip comprising: a housing; guide means on said housing for supporting and guiding a card-like article; means in said housing for retaining a supply of strip material having an adhesively coated side; a laminating pressure surface adjacent to the guide means; a generally cylindrical drum supported on said housing adjacent to said pressure surface and being enlarged relative thereto, supporting roller means positioned above said drum with a pair of endless belts wrapped about said drum and supporting rollers for movement through an endless path of travel whereby the strip material may be fed toward the pressure surface and cylindrical drum so that the adhesively coated side thereof faces the endless belts and will be forced into engagement with said belts responsive to movement thereof.

9. The apparatus of claim 8 wherein the drum includes a generally centrally located peripheral groove about the circumference thereof.

10. The apparatus of claim 1 wherein said pressure surface comprises a movable roller member.

11. An apparatus for laminating a card-like article to an adherent strip comprising: a housing; guide means on said housing for supporting and guiding a card-like article; means in said housing for retaining a supply of strip material having an adhesively coated side; a movable roller member defining a laminating pressure surface mounted on a carriage which is movably connected to the housing adjacent to the guide means, and platen means supported on said housing adjacent to said pressure surface and being substantially enlarged relative thereto, said moveable roller being movable being mounted for movement across the platen means, with said adherent strip being fed toward said pressure surface and platen means so that the adhesive side thereof faces said platen means.

12. The apparatus of claim 11 wherein the carriage is mounted for movement toward and away from the platen.

13. The apparatus of claim 12 wherein the platen is a generally arcuate segment.

14. The apparatus of claim 12 wherein the platen is a generally planar member.

(References on following page)

References Cited

UNITED STATES PATENTS

| | | | |
|---|---|---|---|
| 3,340,130 | 9/1967 | Dunn et al. | 156—552 |
| 2,652,166 | 9/1953 | Johnson | 156—522 |
| 1,297,642 | 3/1919 | Boyer | 156—552 X |
| 2,107,900 | 2/1938 | Munro | 156—522 |
| 2,528,856 | 11/1950 | Caldwell | 156—552 |
| 2,704,168 | 3/1955 | Nord et al. | 156—517 X |
| 2,919,044 | 12/1959 | Northrup | 156—517 X |
| 3,143,452 | 8/1964 | Larkin | 156—522 |
| 3,143,454 | 8/1964 | Hannon | 100—171 X |
| 3,654,042 | 4/1972 | Lipsie | 156—555 X |
| 3,658,629 | 4/1972 | Cramer et al. | 156—555 X |
| 3,677,869 | 7/1972 | Morse et al. | 156—517 X |

HAROLD ANSHER, Primary Examiner

U.S. Cl. X.R.

100—171, 176; 156—552, 555, 580